United States Patent
Kong et al.

(10) Patent No.: US 9,971,202 B2
(45) Date of Patent: May 15, 2018

(54) ALIGNMENT LAYER, LIQUID CRYSTAL DISPLAY INCLUDING THE SAME, AND METHOD OF MANUFACTURING LIQUID CRYSTAL DISPLAY

(71) Applicant: SAMSUNG DISPLAY CO., LTD., Yongin, Gyeonggi-do (KR)

(72) Inventors: Taejin Kong, Gyeonggi-Do (KR); Sanggyun Kim, Gyeonggi-Do (KR); Duckjong Suh, Gyeonggi-Do (KR); Taekjoon Lee, Gyeonggi-Do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days. days.

(21) Appl. No.: 14/818,815

(22) Filed: Aug. 5, 2015

(65) Prior Publication Data
US 2016/0231625 A1    Aug. 11, 2016

(30) Foreign Application Priority Data

Feb. 5, 2015    (KR) .................. 10-2015-0018129

(51) Int. Cl.
  C09K 19/00    (2006.01)
  G02F 1/1337    (2006.01)
  (Continued)

(52) U.S. Cl.
  CPC .. *G02F 1/133711* (2013.01); *G02F 1/133788* (2013.01); *G02F 1/139* (2013.01);
  (Continued)

(58) Field of Classification Search
  CPC ............ G02F 1/1337; G02F 1/133711; G02F 1/133715; G02F 1/133723;
  (Continued)

(56) References Cited

U.S. PATENT DOCUMENTS

| | | |
|---|---|---|
| 6,201,588 B1 | 3/2001 | Walton et al. |
| 2008/0160222 A1 | 7/2008 | Harding et al. |
| 2013/0114010 A1 | 5/2013 | Goetz et al. |
| 2013/0129965 A1 | 5/2013 | Jeong et al. |

(Continued)

FOREIGN PATENT DOCUMENTS

| | | |
|---|---|---|
| JP | 10-268318 | 10/1998 |
| JP | 2007-501958 | 2/2007 |

(Continued)

*Primary Examiner* — Ruiyun Zhang
(74) *Attorney, Agent, or Firm* — F. Chau & Associates, LLC

(57) ABSTRACT

Provided is an alignment layer including a copolymer including a first compound and a second compound. The first compound is different than the second compound. The first compound and the second compound are each independently selected from a compound represented by Formula 1:

<Formula 1>

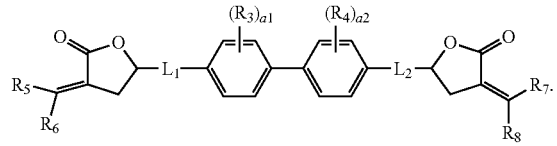

12 Claims, 6 Drawing Sheets

(51) Int. Cl.
  *G02F 1/139* (2006.01)
  *G02F 1/1333* (2006.01)
(52) U.S. Cl.
  CPC ............ *G02F 2001/133397* (2013.01); *G02F 2001/133742* (2013.01); *Y10T 428/1005* (2015.01); *Y10T 428/1023* (2015.01)
(58) Field of Classification Search
  CPC ......... G02F 1/133726; G02F 1/133788; G02F 1/1341; G02F 2001/133715; G02F 2001/133747; G02F 2001/133726; Y10T 428/1005; Y10T 428/1023; C09K 19/56; C09K 2019/0448; C09K 2019/122
  USPC ................. 428/1.1, 1.2, 1.26; 349/123, 127; 525/57, 103, 180, 182, 236; 526/236
  See application file for complete search history.

(56) References Cited

U.S. PATENT DOCUMENTS

| 2014/0320790 | A1 | 10/2014 | Lee et al. |
| 2015/0062517 | A1 | 3/2015 | Lee et al. |
| 2015/0116643 | A1 | 4/2015 | Suh et al. |

FOREIGN PATENT DOCUMENTS

| KR | 1020130038339 | 4/2013 | | |
| KR | 1020130042572 | 4/2013 | | |
| KR | 1020130057153 | 5/2013 | | |
| KR | 1020130135822 | 12/2013 | | |
| KR | 1020150026279 | 3/2015 | | |
| WO | 2012002511 | 1/2012 | | |
| WO | WO 2012002511 A1 * | 1/2012 | ............ | C07D 307/58 |
| WO | WO 2015115588 A1 * | 8/2015 | ............ | C09D 179/08 |

* cited by examiner

ALIGNMENT LAYER, LIQUID CRYSTAL DISPLAY INCLUDING THE SAME, AND METHOD OF MANUFACTURING LIQUID CRYSTAL DISPLAY

CROSS-REFERENCE TO RELATED APPLICATION

This application claims priority under 35 U.S.C. § 119 to Korean Patent Application No. 10-2015-0018129, filed on Feb. 5, 2015, in the Korean Intellectual Property Office, the disclosure of which is incorporated by reference herein in its entirety.

1. Technical Field

Exemplary embodiments of the present invention relate to an alignment layer, a liquid crystal display (LCD) including the alignment layer, and a method of manufacturing the LCD.

2. Discussion of Related Art

Liquid crystal displays (LCDs) devices are generally flat. LCDs may include two substrates, field-generating electrodes such as pixel electrodes, common electrodes, and a liquid crystal layer disposed between the two substrates. LCDs may display images by applying a voltage to the field-generating electrodes to generate an electric field in the liquid crystal layer, determining a direction in which the liquid crystal molecules of the liquid crystal layer are aligned by using the electric field, and controlling polarization of incident light.

SUMMARY

One or more exemplary embodiments of the present invention include an alignment layer, a liquid crystal display (LCD) including the alignment layer, and a method of manufacturing the LCD.

According to one or more exemplary embodiments of the present invention, an alignment layer includes a copolymer including a first compound and a second compound. The first compound is different than the second compound. The first compound and the second compound are each independently selected from a compound represented by Formula 1:

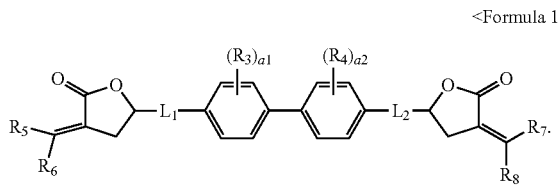

<Formula 1>

In Formula 1, $L_1$ is selected from a single bond and $-R_1O-$, and $L_2$ is selected from a single bond and $-OR_2-$.

$R_1$ and $R_2$ are each independently a substituted or unsubstituted $C_1$-$C_{20}$ alkylene group.

$R_3$, $R_4$, $R_5$, $R_6$, $R_7$ and $R_8$ are each independently selected from a hydrogen, a deuterium, $-F$, $-Cl$, $-Br$, $-I$, a hydroxyl group, a cyano group, a nitro group, an amino group, an amidino group, a hydrazine group, a hydrazone group, a carboxylic acid or a salt thereof, a sulfonic acid or a salt thereof, a phosphoric acid or a salt thereof, a substituted or unsubstituted $C_1$-$C_{60}$ alkyl group, a substituted or unsubstituted $C_2$-$C_{60}$ alkenyl group, a substituted or unsubstituted $C_2$-$C_{60}$ alkynyl group, a substituted or unsubstituted $C_1$-$C_{60}$ alkoxy group, a substituted or unsubstituted $C_3$-$C_{10}$ cycloalkyl group, a substituted or unsubstituted $C_1$-$C_{10}$ heterocycloalkyl group, a substituted or unsubstituted $C_3$-$C_{10}$ cycloalkenyl group, a substituted or unsubstituted heterocycloalkenyl group, a substituted or unsubstituted $C_6$-$C_{60}$ aryl group, a substituted or unsubstituted $C_6$-$C_{60}$ aryloxy group, a substituted or unsubstituted $C_6$-$C_{60}$ arylthio group, a substituted or unsubstituted $C_1$-$C_{60}$ heteroaryl group, a substituted or unsubstituted monovalent non-aromatic condensed polycyclic group, a substituted or unsubstituted monovalent non-aromatic condensed heteropolycyclic group, $-Si(Q_1)(Q_2)(Q_3)$, and $-B(Q_4)(Q_5)$.

a1 and a2 are each independently an integer selected from 0 to 4.

At least one substituent of the substituted $C_1$-$C_{20}$ alkylene group, substituted $C_1$-$C_{60}$ alkyl group, substituted $C_2$-$C_{60}$ alkenyl group, substituted $C_2$-$C_{60}$ alkynyl group, substituted $C_1$-$C_{60}$ alkoxy group, substituted $C_3$-$C_{10}$ cycloalkyl group, substituted $C_1$-$C_{10}$ heterocycloalkyl group, substituted $C_3$-$C_{10}$ cycloalkenyl group, substituted $C_1$-$C_{10}$ heterocycloalkenyl group, substituted $C_6$-$C_{60}$ aryl group, substituted $C_6$-$C_{60}$ aryloxy group, substituted $C_6$-$C_{60}$ arylthio group, substituted $C_1$-$C_{60}$ heteroaryl group, substituted monovalent non-aromatic condensed polycyclic group, and substituted monovalent non-aromatic condensed heteropolycyclic group is selected from a deuterium, $-F$, $-Cl$, $-Br$, $-I$, a hydroxyl group, a cyano group, a nitro group, an amino group, an amidino group, a hydrazine group, a hydrazone group, a carboxylic acid or a salt thereof, a sulfonic acid or a salt thereof, a phosphoric acid or a salt thereof, a $C_1$-$C_{60}$ alkyl group, a $C_2$-$C_{60}$ alkenyl group, a $C_2$-$C_{60}$ alkynyl group, a $C_1$-$C_{60}$ alkoxy group, a $C_3$-$C_{10}$ cycloalkyl group, a $C_1$-$C_{10}$ heterocycloalkyl group, a $C_3$-$C_{10}$ cycloalkenyl group, a $C_1$-$C_{10}$ heterocycloalkenyl group, a $C_6$-$C_{60}$ aryl group, a $C_6$-$C_{60}$ aryloxy group, a $C_6$-$C_{60}$ arylthio group, a $C_1$-$C_{60}$ heteroaryl group, a monovalent non-aromatic condensed polycyclic group, and a monovalent non-aromatic condensed heteropolycyclic group.

$Q_1$, $Q_2$, $Q_3$, $Q_4$, and $Q_5$ are each independently selected from a hydrogen, a deuterium, $-F$, $-Cl$, $-Br$, $-I$, a hydroxyl group, a cyano group, a nitro group, an amino group, an amidino group, a hydrazine group, a hydrazone group, a carboxylic acid or a salt thereof, a sulfonic acid or a salt thereof, a phosphoric acid or a salt thereof, a $C_1$-$C_{60}$ alkyl group, a $C_2$-$C_{60}$ alkenyl group, a $C_2$-$C_{60}$ alkynyl group, a $C_1$-$C_{60}$ alkoxy group, a $C_3$-$C_{10}$ cycloalkyl group, a $C_1$-$C_{10}$ heterocycloalkyl group, a $C_3$-$C_{10}$ cycloalkenyl group, a $C_1$-$C_{10}$ heterocycloalkenyl group, a $C_6$-$C_{60}$ aryl group, a $C_1$-$C_{60}$ heteroaryl group, a monovalent non-aromatic condensed polycyclic group, and a monovalent non-aromatic condensed heteropolycyclic group.

According to one or more exemplary embodiments of the present invention, a liquid crystal display (LCD) includes a first substrate, a second substrate facing the first substrate, a liquid crystal layer disposed between the first substrate and the second substrate. A first alignment layer is disposed between the first substrate and the liquid crystal layer. The first alignment layer is the alignment layer described above.

According to one or more exemplary embodiments of the present invention, a method of manufacturing an LCD includes providing a first alignment layer-forming composition including a first compound, a second compound, and a vertical alignment polymer disposed on a first substrate.

The first compound is different than the second compound. The first compound and the second compound are each independently selected from the compound represented by Formula 1. The method of manufacturing an LCD includes preparing a second substrate. method of manufacturing an LCD includes bonding the first substrate to the second substrate. A first alignment layer-forming composition is disposed between the first substrate and the second substrate. The method of manufacturing an LCD includes depositing a liquid crystal composition between the first alignment layer-forming composition and the second substrate and aligning a liquid crystal in the liquid crystal composition.

BRIEF DESCRIPTION OF THE DRAWINGS

The above and other features of the present invention will become more apparent by describing in detail exemplary embodiments thereof, with reference to the accompanying drawings in which.

DETAILED DESCRIPTION

Figure 1:
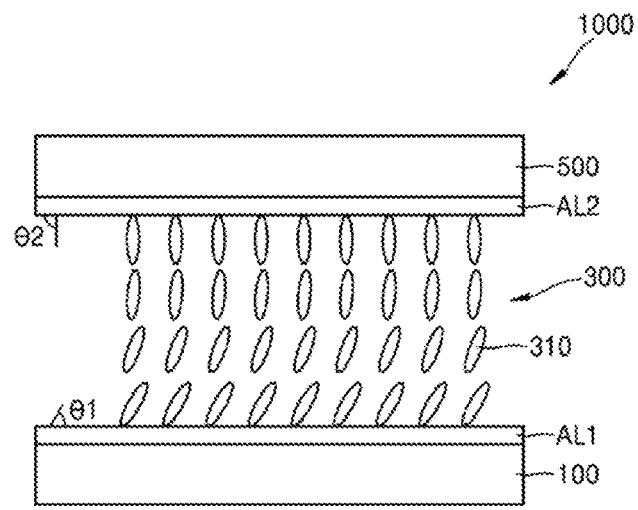
FIG. 1 is a schematic cross-sectional view of a liquid crystal display (LCD) according to an exemplary embodiment of the present invention.

The present invention will now be described more fully with reference to exemplary embodiments. Like reference numerals may refer to like elements throughout the specification and drawings. Exemplary embodiments of the present invention may have different forms and should not be construed as being limited to the exemplary embodiments described herein. Expressions such as "at least one of," when preceding a list of elements, may modify the entire list of elements and might not modify the individual elements of the list.

Effects, features, and methods of achieving the exemplary embodiments of the present invention may be described by referring to exemplary embodiments of the present invention with reference to the attached drawings. The exemplary embodiments of the present invention may, however, be embodied in many different forms and should not be construed as being limited to the exemplary embodiments set forth herein.

Hereinafter, exemplary embodiments of the present invention will be described in more detail with reference to the accompanying drawings. Like reference numerals in the specification and drawings may denote like elements.

It will be understood that, although the terms first, second, etc. may be used herein to describe various elements, these elements should not be limited by these terms.

In exemplary embodiments of the present invention, an expression used in the singular may encompass the expression of the plural.

Sizes of components in the drawings may be exaggerated for clarity of explanation.

An alignment layer according to an exemplary embodiment of the present invention may include a copolymer including a first compound and a second compound. The first compound may be different than the second compound. The first compound and the second compound may be each independently selected from a compound represented by Formula 1:

<Formula 1>

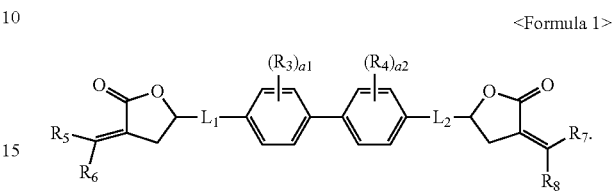

$L_1$ may be selected from a single bond and —$R_1O$—, and $L_2$ may be selected from a single bond and —$OR_2$—.

In some exemplary embodiments of the present invention, $L_1$ may be —$R_1O$—, and $L_2$ may be —$OR_2$, but exemplary embodiments of the present invention are not limited thereto.

$R_1$ and $R_2$ may each independently be a substituted or unsubstituted $C_1$-$C_{20}$ alkylene group.

In some exemplary embodiments of the present invention, $R_1$ and $R_2$ may be each independently selected from a $C_1$-$C_{20}$ alkylene group, but exemplary embodiments of the present invention are not limited thereto.

$R_3$, $R_4$, $R_5$, $R_6$, $R_7$ and $R_8$ may be each independently selected from a hydrogen, a deuterium, —F, —Cl, —Br, —I, a hydroxyl group, a cyano group, a nitro group, an amino group, an amidino group, a hydrazine group, a hydrazone group, a carboxylic acid or a salt thereof, a sulfonic acid or a salt thereof, a phosphoric acid or a salt thereof, a substituted or unsubstituted $C_1$-$C_{60}$ alkyl group, a substituted or unsubstituted $C_2$-$C_{60}$ alkenyl group, a substituted or unsubstituted $C_2$-$C_{60}$ alkynyl group, a substituted or unsubstituted $C_1$-$C_{60}$ alkoxy group, a substituted or unsubstituted $C_3$-$C_{10}$ cycloalkyl group, a substituted or unsubstituted $C_1$-$C_{10}$ heterocycloalkyl group, a substituted or unsubstituted $C_3$-$C_{10}$ cycloalkenyl group, a substituted or unsubstituted $C_1$-$C_{10}$ heterocycloalkenyl group, a substituted or unsubstituted $C_6$-$C_{60}$ aryl group, a substituted or unsubstituted $C_6$-$C_{60}$ aryloxy group, a substituted or unsubstituted $C_6$-$C_{60}$ arylthio group, a substituted or unsubstituted $C_1$-$C_{60}$ heteroaryl group, a substituted or unsubstituted monovalent non-aromatic condensed polycyclic group, a substituted or unsubstituted monovalent non-aromatic condensed heteropolycyclic group, —Si($Q_1$)($Q_2$)($Q_3$), and —B($Q_4$)($Q_5$). $Q_1$, $Q_2$, $Q_3$, $Q_4$ and $Q_5$ will be described in more detail below.

In some exemplary embodiments of the present invention, $R_3$ and $R_4$ may be each independently selected from a hydrogen, —F, a cyano group, a nitro group, a methyl group, an ethyl group, a propyl group, an n-butyl group, an iso-butyl group, a sec-butyl group, a tert-butyl group, an n-pentyl group, an iso-pentyl group, a sec-pentyl group, a tert-pentyl group, an n-hexyl group, an iso-hexyl group, a sec-hexyl group, a tert-hexyl group, an n-heptyl group, an iso-heptyl group, a sec-heptyl group, a tert-heptyl group, an n-octyl group, an iso-octyl group, a sec-octyl group, a tert-octyl group, an n-nonyl group, an iso-nonyl group, a sec-nonyl group, a tert-nonyl group, an n-decanyl group, an iso-decanyl group, a sec-decanyl group, a tert-decanyl group, a methoxy group, an ethoxy group, a propoxy group, a butoxy group, a pentoxy group, a phenyl group, a naphthyl group, a pyridinyl group, a pyrimidinyl group, and a triazinyl group.

$R_3$ and $R_4$ may be each independently selected from —Si($Q_{31}$)($Q_{32}$)($Q_{33}$) and —Si($Q_1$)($Q_2$)($Q_3$).

$Q_1$, $Q_2$, $Q_3$, $Q_{31}$, $Q_{32}$ and $Q_{33}$ may be each independently selected from a hydrogen, a $C_1$-$C_{20}$ alkyl group, a $C_1$-$C_{20}$ alkoxy group, a phenyl group, a naphthyl group, a pyridinyl group, a pyrimidinyl group, a triazinyl group, a quinolinyl group, and an iso-quinolinyl group, but exemplary embodiments of the present invention are not limited thereto.

In some exemplary embodiments of the present invention, $R_5$, $R_6$, $R_7$ and $R_8$ may be each independently selected from a hydrogen, a deuterium, —F, —Cl, —Br, —I, a hydroxyl group, a cyano group, a nitro group, an amino group, an amidino group, a hydrazine group, a hydrazone group, a carboxylic acid or a salt thereof, a sulfonic acid or a salt thereof, a phosphoric acid or a salt thereof, a substituted or unsubstituted $C_1$-$C_{20}$ alkyl group, and a substituted or unsubstituted $C_1$-$C_{20}$ alkoxy group, but exemplary embodiments of the present invention are not limited thereto.

a1 may refer to the number of $R_3$(s). a1 may be an integer selected from 0 to 4. In some exemplary embodiments of the present invention, a1 may be 0 or 1, but exemplary embodiments of the present invention are not limited thereto. When a1 is 2 or more, a plurality of $R_3$(s) may be the same as or different from each other.

a2 may refer to the number of $R_4$(s). a2 may be an integer selected from 0 to 4. In some exemplary embodiments of the present invention, a2 may be 0 or 1, but exemplary embodiments of the present invention are not limited thereto. When a2 is 2 or more, a plurality of $R_4$(s) may be the same as or different from each other.

In some exemplary embodiments of the present invention, the first compound may be selected from a compound in which $R_1$ and $R_2$ in Formula 1 are a $C_1$-$C_3$ alkylene group, and the second compound may be selected from a compound in which $R_1$ and $R_2$ in Formula 1 are a $C_4$-$C_{20}$ alkylene group, but exemplary embodiments of the present invention are not limited thereto.

In some exemplary embodiments of the present invention, the first compound may be selected from a compound in which at least one of a1 and a2 in Formula 1 may be 1, 2, 3, or 4, and the second compound may be selected from a compound in which at least one of a1 and a2 in Formula 1 may be 0, but exemplary embodiments of the present invention are not limited thereto.

The compound represented by Formula 1 may be represented by one of Compounds 1-1, 1-2 and 1-3, but exemplary embodiments of the present invention are not limited thereto:

<Compound 1-1>

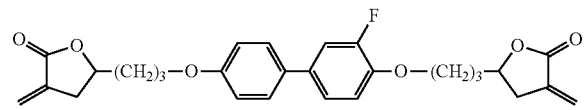

<Compound 1-2>

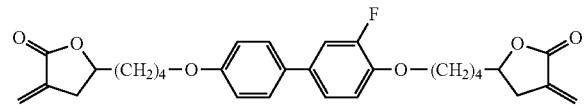

-continued
<Compound 1-3>

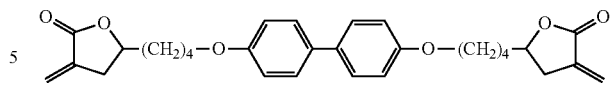

Compounds 1-1, 1-2, and 1-3 may be synthesized by using one or more known organic synthesis methods.

In some exemplary embodiments of the present invention, the copolymer including the first compound and the second compound may include a first repeating unit and a second repeating unit. The first repeating unit may be different than the second repeating unit. The first repeating unit and the second repeating unit may each independently include a polymer selected from a unit represented by Formula 1-1:

<Formula 1-1>

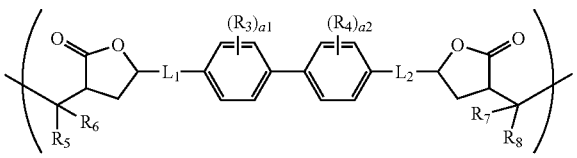

In Formula 1-1, $L_1$ may be selected from a single bond and —$R_1$O—, and $L_2$ may be selected from a single bond and —O$R_2$—.

$R_1$ and $R_2$ may be each independently a substituted or unsubstituted $C_1$-$C_{20}$ alkylene group.

$R_3$ and $R_4$ may be each independently selected from a hydrogen, —F, a cyano group, a nitro group, a methyl group, an ethyl group, a propyl group, an n-butyl group, an iso-butyl group, a sec-butyl group, a tert-butyl group, an n-pentyl group, an iso-pentyl group, a sec-pentyl group, a tert-pentyl group, an n-hexyl group, an iso-hexyl group, a sec-hexyl group, a tert-hexyl group, an n-heptyl group, an iso-heptyl group, a sec-heptyl group, a tert-heptyl group, an n-octyl group, an iso-octyl group, a sec-octyl group, a tert-octyl group, an n-nonyl group, an iso-nonyl group, a sec-nonyl group, a tert-nonyl group, an n-decanyl group, an iso-decanyl group, a sec-decanyl group, a tert-decanyl group, a methoxy group, an ethoxy group, a propoxy group, a butoxy group, a pentoxy group, a phenyl group, a naphthyl group, a pyridinyl group, a pyrimidinyl group, and a triazinyl group;

a methyl group, an ethyl group, a propyl group, an n-butyl group, an iso-butyl group, a sec-butyl group, a tert-butyl group, an n-pentyl group, an iso-pentyl group, a sec-pentyl group, a tert-pentyl group, an n-hexyl group, an iso-hexyl group, a sec-hexyl group, a tert-hexyl group, an n-heptyl group, an iso-heptyl group, a sec-heptyl group, a tert-heptyl group, an n-octyl group, an iso-octyl group, a sec-octyl group, a tert-octyl group, an n-nonyl group, an iso-nonyl group, a sec-nonyl group, a tert-nonyl group, an n-decanyl group, an iso-decanyl group, a sec-decanyl group, a tert-decanyl group, a methoxy group, an ethoxy group, a propoxy group, a butoxy group, a pentoxy group, a phenyl group, a naphthyl group, a pyridinyl group, a pyrimidinyl group, and a triazinyl group, each substituted with at least one selected from —F, a cyano group, a nitro group, a phenyl group, a naphthyl group, a pyridinyl group, a pyrimidinyl group, a triazinyl group, and —Si($Q_{33}$)($Q_{34}$)($Q_{35}$); and
—Si($Q_1$)($Q_2$)($Q_3$);

wherein $Q_1$, $Q_2$, $Q_3$, $Q_{31}$, $Q_{32}$ and $Q_{33}$ may be each independently selected from a hydrogen, a $C_1$-$C_{20}$ alkyl group, a $C_1$-$C_{20}$ alkoxy group, a phenyl group, a naphthyl group, a pyridinyl group, a pyrimidinyl group, a triazinyl group, a quinolinyl group, and an iso-quinolinyl group.

$R_5$, $R_6$, $R_7$ and $R_8$ may be each independently selected from a hydrogen, a deuterium, —F, —Cl, —Br, —I, a hydroxyl group, a cyano group, a nitro group, an amino group, an amidino group, a hydrazine group, a hydrazone group, a carboxylic acid or a salt thereof, a sulfonic acid or a salt thereof, a phosphoric acid or a salt thereof, a substituted or unsubstituted $C_1$-$C_{20}$ alkyl group, and a substituted or unsubstituted $C_1$-$C_{20}$ alkoxy group.

a1 and a2 may be each independently selected from 0 and 1.

In some exemplary embodiments of the present invention, the copolymer including the first compound and the second compound may be cross-linked. The cross-linked first and second compounds may form a network. The copolymer including the first compound and the second compound may include liquid crystal molecules having a pre-tilt angle, as described below in more detail. Thus, the liquid crystal molecules may have a pre-tilt angle even when a voltage is not applied to the liquid crystal layer.

In some exemplary embodiments of the present invention, the alignment layer may include a vertical alignment polymer. The vertical alignment polymer may be arranged such that the angle with respect to a surface of a substrate may be smaller than 90°, thereby aligning liquid crystal molecules in contact with the substrate in the same direction.

The vertical alignment polymer may be selected from a polysiloxane, a polyamic acid, polyimide, nylon, polyvinyl alcohol, and polyvinyl chloride. The vertical alignment polymer may include at least one vertical alignment group, but exemplary embodiments of the present invention are not limited thereto.

The vertical alignment polymer may be prepared by an imidization reaction of a dianhydride-based monomer and a diamine-based monomer. The dianhydride-based monomer may include an alicyclic dianhydride-based monomer, which may allow the vertical alignment polymer to dissolve in a solvent, thereby increasing electric optical characteristics of the alignment layer.

The diamine-based monomer may include an unsubstituted aromatic diamine-based monomer or a substituted aromatic diamine-based monomer including a vertical alignment group. The diamine-based monomer may form a main chain of the alignment layer by the imidization reaction during the process of forming the alignment layer.

In some exemplary embodiments of the present invention, the vertical alignment polymer may include a repeating unit represented by Formula 2, but exemplary embodiments of the present invention are not limited thereto.

<Formula 2>

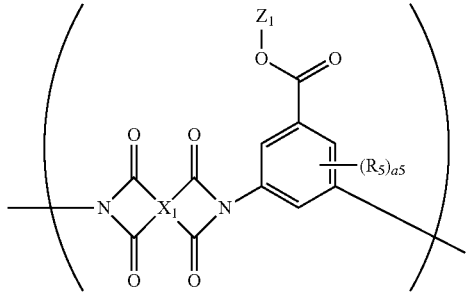

In Formula 2, $X_1$ may be selected from a group represented by one of Formulae 3-1, 3-2, 3-3, 3-4, 3-5, 3-6, 3-7, 3-8 and 3-9, and $Z_1$ may be a vertical alignment group.

Formula 3-1

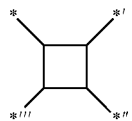

Formula 3-2

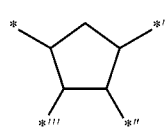

Formula 3-3

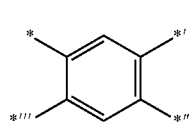

Formula 3-4

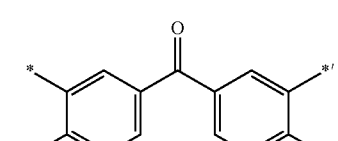

Formula 3-5

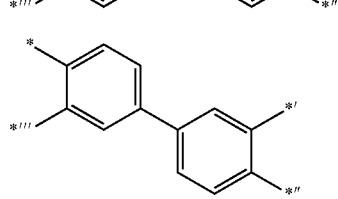

Formula 3-6

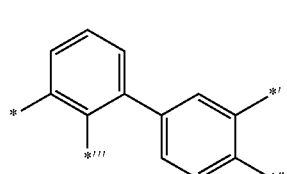

Formula 3-7

Formula 3-8

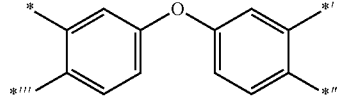

Formula 3-9

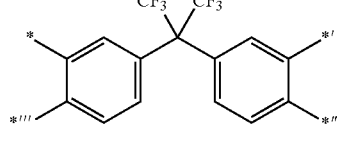

In Formulae 3-1, 3-2, 3-3, 3-4, 3-5, 3-6, 3-7, 3-8 and 3-9, *, *', *'', and *''' may each indicate a binding site to an adjacent atom.

In some exemplary embodiments of the present invention, the vertical alignment group may be selected from a group represented by Formula 4, but exemplary embodiments of the present invention are not limited thereto.

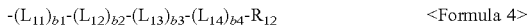
<div align="right"><Formula 4></div>

In Formula 4, $L_{11}$ may be selected from a single bond and —$R_{11}$O—

$L_{12}$, $L_{13}$, and $L_{14}$ may be each independently selected from a phenylene group and a $C_3$-$C_{10}$ cycloalkylene group.

b1, b2, b3, and b4 may be each independently selected from 0 and 1.

$R_{11}$ may be a substituted or unsubstituted $C_1$-$C_{20}$ alkylene group.

$R_{12}$ may be selected from a hydrogen, a deuterium, —F, —Cl, —Br, —I, a hydroxyl group, a cyano group, a nitro group, an amino group, an amidino group, a hydrazine group, a hydrazone group, a carboxylic acid or a salt thereof, a sulfonic acid or a salt thereof, a phosphoric acid or a salt thereof, a substituted or unsubstituted $C_1$-$C_{20}$ alkyl group, and a substituted or unsubstituted $C_1$-$C_{20}$ alkoxy group.

In some exemplary embodiments of the present invention, the vertical alignment group may be represented by Formula 5-1, but exemplary embodiments of the present invention are not limited thereto.

<div align="right">Formula 5-1</div>
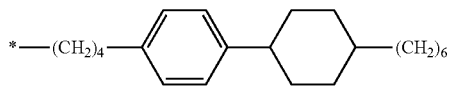

In Formula 5-1, * may indicate a binding site to an adjacent atom.

In Formula 2, $R_5$ may be selected from a deuterium, —F, —Cl, —Br, —I, a hydroxyl group, a cyano group, a nitro group, an amino group, an amidino group, a hydrazine group, a hydrazone group, a carboxylic acid or a salt thereof, a sulfonic acid or a salt thereof, a phosphoric acid or a salt thereof, a substituted or unsubstituted $C_1$-$C_{20}$ alkyl group, and a substituted or unsubstituted $C_1$-$C_{20}$ alkoxy group.

a5 may indicate the number of $R_5$(s). a5 may be an integer selected from 0 to 3. When a5 is 2 or more, a plurality of $R_5$(s) may be the same as or different from each other.

*, *', *'', and *''' may each indicate a binding site to an adjacent atom.

A liquid crystal display (LCD) according to an exemplary embodiment of the present invention may include a first substrate, a second substrate facing the first substrate, a liquid crystal layer disposed between the first substrate and the second substrate, and a first alignment layer disposed between the first substrate and the liquid crystal layer.

FIG. 1 is a schematic cross-sectional view of an LCD according to an exemplary embodiment of the present invention. Hereinafter, a structure of an LCD 1000 and a method of manufacturing the LCD 1000 will be described in more detail with reference to FIG. 1.

The LCD 1000 may include a first substrate 100, a second substrate 500 opposite to the first substrate 100, and a liquid crystal layer 300 disposed between the first substrate 100 and the second substrate 500. The liquid crystal layer 300 may include liquid crystal molecules 310.

The first substrate 100 and/or the second substrate 500 may be a glass substrate or a plastic substrate including polyethylene terephthalate (PET), polyethylene naphthalate (PEN) or polyimide.

A first alignment layer AL1 may be disposed between the first substrate 100 and the liquid crystal layer 300. The first alignment layer AL1 may have a predetermined pre-tilt angle with respect to the liquid crystal molecules 310. A major axis of the liquid crystal molecules 310 in contact with the first alignment layer AL1 might not be at a right angle with respect to the surface of the first substrate 100. An angle θ1 with respect to the surface of the first substrate 100 may be less than 90°. The angle θ1 may be, for example, from about 85° to about 89.5°.

The first alignment layer AL1 may include the copolymer including the first compound and the second compound. The first compound may be different than the second compound. The first compound and the second compound may be each independently selected from a compound represented by Formula 1.

In some exemplary embodiments of the present invention, the copolymer including the first compound and the second compound may be disposed between the first alignment layer AL1 and the liquid crystal layer 300. The copolymer including the first compound and the second compound may form a network. The network may enable the liquid crystal molecules to have a pre-tilt angle even when a voltage is not applied to the liquid crystal layer 300, as described in more detail below.

The liquid crystal layer 300 may include a plurality of the liquid crystal molecules 310. When an electric field is formed in the liquid crystal layer 300, a major axis of the liquid crystal molecules 310 may be aligned perpendicularly with respect to the electric field. The liquid crystal molecules 310 may be liquid crystal molecules having negative dielectric anisotropy. When an electric field is not formed in the liquid crystal layer 300, the liquid crystal molecules 310 may be aligned substantially perpendicularly with respect to the surface of the first substrate 100. The liquid crystal molecules 310 may have a relatively small pre-tilt angle determined by the first alignment layer AL1.

In some exemplary embodiments of the present invention, the LCD may include a second alignment layer AL2 disposed between the second substrate 500 and the liquid crystal layer 300. The second alignment layer AL2 may include at least one selected from a polysiloxane, a polyamic acid, polyimide, nylon, polyvinyl alcohol, and polyvinyl chloride.

Figure 2:
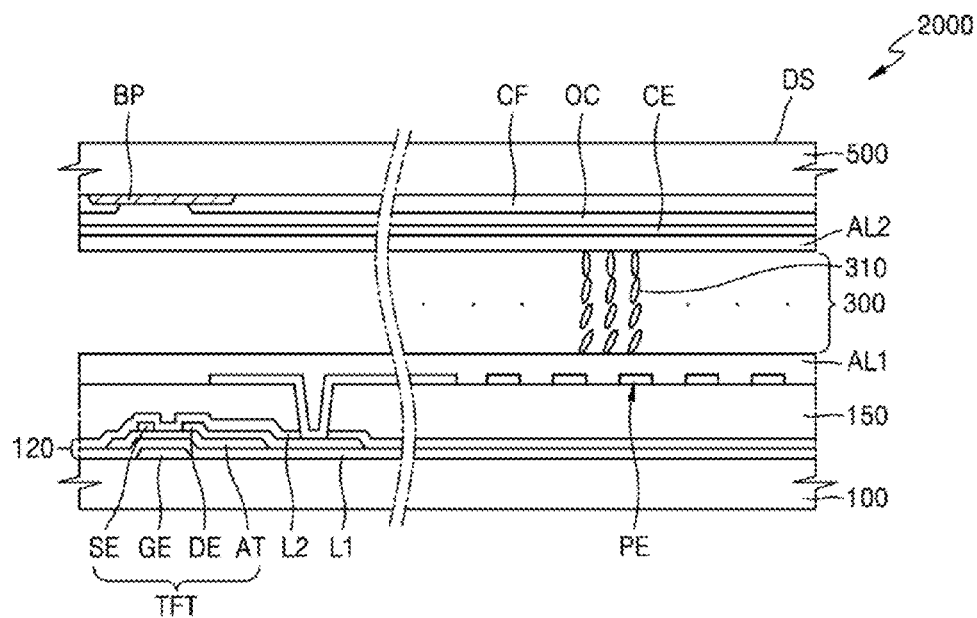
FIG. 2 is a schematic cross-sectional view of an LCD according to an exemplary embodiment of the present invention.

FIG. 2 is a schematic cross-sectional view of an LCD according to an exemplary embodiment of the present invention. Referring to FIG. 2, the LCD 2000 may include the first substrate 100, the second substrate 500, and the liquid crystal layer 300 disposed between the first substrate 100 and the second substrate 500. The liquid crystal layer 300 may include the plurality of liquid crystal molecules 310 having negative dielectric anisotropy. Lower liquid crystal molecules 310 that are adjacent to the first substrate 100 may have a predetermined pre-tilt angle of from about 0.5° to about 15°. Upper liquid crystal molecules 310 that are adjacent to the second substrate 500 may be aligned substantially perpendicularly with respect to the surface of the second substrate 500 without having a pre-tilt angle. The first alignment layer AL1 may be disposed on the first substrate 100, and the second alignment layer AL2 may be disposed on the second substrate 500, as illustrated in FIG. 1.

A thin film transistor (TFT) array layer 120 and a pixel electrode PE may be disposed on the first substrate 100. The TFT array layer 120 may include a plurality of switching devices TFT, a plurality of gate lines and a plurality of data lines.

The switching device TFT may be a thin film transistor. The switching device TFT may include an active layer AT, a gate electrode GE, a source electrode SE, and a drain electrode DE.

A first insulating layer L1, which may be a gate insulating layer, may be disposed on the gate electrode GE. The active layer AT may be disposed on the first insulating layer L1. The source electrode SE and the gate electrode GE may be disposed on the active layer AT and be spaced apart from each other. A second insulating layer L2 may cover the source electrode SE and the drain electrode DE.

The active layer AT may include various materials. For example, the active layer AT may include an inorganic semiconductor material such as amorphous silicon or crystalline silicon. According to an exemplary embodiment of the present invention, the active layer AT may include a semiconductor oxide. According to an exemplary embodiment of the present invention, the active layer AT may include an organic semiconductor material.

The gate electrode GE, the source electrode SE, and the drain electrode DE may include at least one metal selected from aluminum (Al), platinum (Pt), palladium (Pd), silver (Ag), magnesium (Mg), gold (Au), nickel (Ni), neodymium (Nd), iridium (Ir), chromium (Cr), nickel (Li), calcium (Ca), molybdenum (Mo), titanium (Ti), tungsten (W), and copper (Cu), and may include in a single layer or multiple layers.

The first insulating layer L1 and the second insulating layer L2 may include various types of insulating materials. The first insulating layer L1 and the second insulating layer L2 may be an insulating layer including at least one selected from $SiO_2$, $SiN_x$, SiON, $Al_2O_3$, $TiO_2$, $Ta_2O_5$, $HfO_2$, $ZrO_2$, BST, and PZT, and may include a single layer or multiple layers.

A planarization layer 150 may be disposed on the TFT array layer 120.

The pixel electrode PE may be disposed on the planarization layer 150. The pixel electrode PE may be connected to the drain electrode DE of the switching element TFT through the planarization layer 150 and the second insulating layer L2.

The first alignment layer AL1 may be disposed on the pixel electrode PE. The first alignment layer AL1 may form a pre-tilt angle in the liquid crystal molecules 310. A light-blocking pattern BP, a color filter CF, an over coating layer OC, and a common electrode CE may be disposed on the second substrate 500. The second alignment layer AL2, which may include vertical alignment materials, may be disposed on the common electrode CE. The second substrate 500 may be a glass substrate or a transparent plastic substrate. The outer surface of the second substrate 500 may be a display surface DS.

The light-blocking pattern BP may be disposed on the second substrate 500 at a position corresponding to a region where the switching device TFT, the gate lines, and the data lines are disposed. The light-blocking pattern BP may block light. The light-blocking pattern BP may be disposed on the first substrate 100.

The color filter CF may be disposed on the second substrate 500 and may filter color light. The position of the color filter CF may be disposed at a different location on the first substrate 500.

The over coating layer OC may be disposed on the second substrate 500 to planarize the upper surface of the second substrate 500. The over coating layer OC may be omitted.

The common electrode CE may be disposed on the second substrate 500. The common electrode CE may face the pixel electrode PE. A reference voltage defining polarity of a voltage applied to the pixel electrode PE (e.g., a common voltage) may be applied to the common electrode CE. The common electrode CE may be flat.

A method of manufacturing the LCD, according to an exemplary embodiment of the present invention, may include forming a first alignment layer-forming composition on a first substrate. The first alignment layer-forming composition may include a first compound, a second compound, and a vertical alignment polymer. The first compound may be a different compound than the second compound. The first compound and the second compound may be each independently selected from the compound represented by Formula 1. The method of manufacturing the LCD may include preparing a second substrate. The first substrate may be bonded to the second substrate. The first alignment layer-forming composition may be between the first substrate and the second substrate. A liquid crystal composition may be formed between the first alignment layer-forming composition and the second substrate. Liquid crystal molecules in the liquid crystal composition may be aligned.

Forming the first alignment layer-forming composition including the first compound, the second compound, and the vertical alignment polymer on the first substrate may include preparing a first substrate. A first alignment layer-forming composition may be formed and may be disposed on the first substrate. The method of manufacturing the LCD may include a first heating of the first substrate and a second heating the first substrate.

In some exemplary embodiments of the present invention, preparing the first substrate may include forming a pixel electrode on the first substrate.

In some exemplary embodiments of the present invention, the first alignment layer-forming composition may be formed by mixing the first compound, the second compound, and the vertical alignment polymer in a known mixer.

In some exemplary embodiments of the present invention, a total amount of the first compound, the second compound, and the vertical alignment polymer may be about 1 part by weight to about 10 parts by weight based on 100 parts by weight of the first alignment layer-forming composition.

According to an exemplary embodiment of the present invention, a total amount of the first compound and the second compound may be about 0.28 parts by weight to about 0.68 parts by weight based on 100 parts by weight of the first alignment layer-forming composition. In some exemplary embodiments of the present invention, a total amount of the first compound and the second compound may be about 0.40 parts by weight to about 0.56 parts by weight based on 100 parts by weight of the first alignment layer-forming composition, but exemplary embodiments of the present invention are not limited thereto.

The amount of the first compound may be about 70 parts by weight to about 80 parts by weight based on 100 parts by weight of a total amount of the first compound and the second compound. The amount of the second compound may be about 20 parts by weight to about 30 parts by weight based on 100 parts by weight of a total amount of the first compound and the second compound. In some exemplary embodiments of the present invention, a weight ratio of the first compound to the second compound may be 2:1, but exemplary embodiments of the present invention are not limited thereto.

The amount of the vertical alignment polymer may be about 3.32 parts by weight to about 3.72 parts by weight based on 100 parts by weight of the first alignment layer-forming composition.

The first alignment layer-forming composition may include an organic solvent. The organic solvent may increase printability of components of the first alignment layer-forming composition and the components may be applied to the substrate widely, thinly, or spreadably.

The organic solvent may be selected from chlorobenzene, dimethyl sulfoxide, dimethyl formamide, N-methyl-pyrrolidone, γ-butyrolactone, ethyl methoxy butanol, methylethoxy butanol, toluene, chloroform, methyl cellosolve, butyl cellosolve, butyl carbitol, tetrahydrofuran, and a combination thereof, but exemplary embodiments of the present invention are not limited thereto.

A total amount of the organic solvent may be about 90 parts by weight to about 99 parts by weight based on 100 parts by weight of the first alignment layer-forming composition. In some exemplary embodiments of the present invention, the total amount of the organic solvent may be about 96 parts by weight based on 100 parts by weight of the first alignment layer-forming composition.

The first alignment layer-forming composition may include a photoinitiator. The photoinitiator may absorb ultraviolet rays (UV), which may result in acceleration of a photopolymerization reaction of the first compound and the second compound.

The photoinitiator may include at least one selected from benzyl dimethyl ketal, alpha-aminoacetophenone, 1-hydroxycyclohexyl ketone, and a mixture thereof, but exemplary embodiments of the present invention are not limited thereto. In some exemplary embodiments of the present invention, the photoinitiator may be selected from Irgacure-127 (Ciba, Switzerland), Irgacure-819 (Ciba, Switzerland), Irgacure-784 (Ciba, Switzerland), Irgacure-369 (Ciba, Switzerland), Irgacure-379 (Ciba, Switzerland), Irgacure-2959 (Ciba, Switzerland), Irgacure-OXE01 (Ciba, Switzerland), Irgacure-OXE02 (Ciba, Switzerland), Irgacure-TPO (Ciba, Switzerland), and a mixture thereof.

A total amount of the photoinitiator may be about 0.01 parts by weight to about 1 part by weight based on 100 parts by weight of the first alignment layer-forming composition.

Applying the first alignment layer-forming composition on the first substrate may be performed using known methods. For example, the first alignment layer-forming composition may be applied on the first substrate by inkjet printing, roll printing, or spin coating.

The first heating the first substrate may be performed at about 80° C. to about 110° C. for about 100 seconds to about 140 seconds. During the first heating, a solvent included in the first alignment layer-forming composition may be vaporized, and the vertical alignment polymer may be substantially perpendicular with respect to the first alignment layer.

The second heating the second substrate may be performed at about 200° C. to about 240° C. for about 1000 seconds to about 1400 seconds. During the second heating, the first alignment layer-forming composition may be hardened, forming a first alignment layer on the first substrate. After the second heating is completed, the first alignment layer may be washed with deionized water, and may further be washed with isopropyl alcohol (IPA).

Preparing the second substrate may include forming the common electrode on the second substrate. In some exemplary embodiments of the present invention, a second alignment layer may be formed on the second substrate.

The first substrate may be bonded to the second substrate with the first alignment layer-forming composition disposed between the first substrate and the second substrate. A liquid crystal composition may be formed between the first alignment layer-forming composition and the second substrate using known methods.

In some exemplary embodiments of the present invention, a spacer (e.g., beads) may be sprayed on the first alignment layer of the first substrate. Then, a surface on which the first alignment layer is formed may be set as an inside surface. The second substrate may be bonded to the inside surface, and a liquid crystal may be deposited on the second substrate to seal the first substrate and the second substrate. The spacer (e.g., beads) may be sprayed on the first alignment layer of the first substrate. A liquid crystal may be deposited on the first alignment layer of the first substrate. A surface on which the first alignment layer is formed may be set as an inside surface. The second substrate may be bonded to the inside surface to seal the first substrate and the second substrate. A thickness of the spacer may be in a range of from about 1 μm to about 30 μm, for example, in a range of from about 2 μm to about 10 μm.

Aligning a liquid crystal in the liquid crystal composition may include annealing the bonded first substrate and second substrate, and exposing the bonded first substrate and second substrate to UV light.

The annealing of the bonded first substrate and second substrate may be performed in a chamber at a temperature of about 100° C. to about 120° C. for about 60 minutes to about 80 minutes.

Exposing the bonded first substrate and second substrate to UV light may include UV exposure in a non-electric field or an electric field. The UV exposure in an electric field may include a process of irradiating the first substrate and the second substrate with UV light while a voltage is applied to the liquid crystal layer and the first alignment layer. In some exemplary embodiments of the present invention, UV exposure in the electric field may include irradiating the liquid crystal layer and the first alignment layer with UV light while maintaining an electric field. The electric field may be formed by applying a voltage between electrodes mounted on the first substrate and second substrate to apply a voltage to the liquid crystal layer. The UV exposure in the electric field may be performed by UV light having an intensity of from about 0.5 J/cm$^2$ to about 40 J/cm$^2$ while applying a voltage of from about 10 V to about 60 V.

When the electric field is formed by applying the voltage to the liquid crystal layer, liquid crystal molecules may be arranged according to characteristics of the liquid crystal molecules and the electric field. A vertical alignment group included in the first alignment layer may be arranged in the same direction as the alignment of the liquid crystal molecules, which may have a pre-tilt angle. When the electric field is applied and the vertical alignment group is arranged, the first compound and the second compound eluted in the liquid crystal layer may be polymerized by UV light, thereby forming a cross-linking. The first compound and the second compound may be polymerized in the electric field, thereby forming a copolymer having a network. Thus, the copolymer including the first compound and the second compound may be arranged to have a pre-tilt angle. Thus, liquid crystal molecules adjacent to the first alignment layer may be arranged to have a pre-tilt angle with respect to the first alignment layer. Accordingly, liquid crystal molecules adjacent to the first alignment layer may be arranged to have a pre-tilt angle due to the copolymer including the first compound and the second compound even when the voltage is not applied to the liquid crystal layer.

The aligning of the liquid crystal in the liquid crystal composition may include exposing the bonded first substrate and second substrate to fluorescent UV light. LCDs manufactured using the fluorescent UV light may have high display quality.

Exposing the bonded first substrate and second substrate to fluorescent UV light may remove the first compound or second compound that is unpolymerized and remains in the liquid crystal layer. When the unpolymerized first compound or second compound remains in the liquid crystal layer, a light leakage phenomenon or after-image may occur, which may result in an LCD of lower quality. Exposing the bonded first substrate and second substrate to fluorescent UV light may be performed with UV light having a wavelength of from about 300 nm to about 390 nm, and illumination of from about 0.05 mW/cm$^2$ to about 0.4 mW/cm$^2$ for about 20 minutes to about 80 minutes.

The alignment layer according to an exemplary embodiment of the present invention may include the copolymer including the first compound and the second compound. The first compound and the second compound may have relatively high heat-resistance and relatively high solubility in a liquid crystal. When the first compound and the second compound are mixed and added to the alignment layer, the amount of precipitated first compound and second compound during the manufacture of a liquid crystal layer may decrease due to an interaction of the first compound and the second compound, compared to the case of only adding the first compound or the second compound to the alignment layer. Thus, the amount of the first compound or the second compound remaining in the liquid crystal layer without being polymerized during the exposure to the electric field may be reduced or eliminated, which may result in a reduction or elimination of light leakage or an occurrence of an after-image. The LCD including the alignment layer may have a relatively high display quality.

The LCD including the alignment layer may have relatively high display quality due to the reduction or elimination of light leakage and/or the reduction or elimination of the occurrence of the after-image under various second heating temperature conditions.

The $C_1$-$C_{60}$ alkyl group as described herein may refer to a linear or branched aliphatic hydrocarbon monovalent group having 1 to 60 carbon atoms. Examples of the $C_1$-$C_{60}$ alkyl group may include a methyl group, an ethyl group, a propyl group, an iso-butyl group, a sec-butyl group, a tert-butyl group, a pentyl group, an iso-amyl group, and a hexyl group. The $C_1$-$C_{60}$ alkylene group described herein may refer to a divalent group having the same structure as a $C_1$-$C_{60}$ alkyl group.

The $C_1$-$C_{60}$ alkoxy group described herein may refer to a monovalent group represented by —$OA_{101}$. $A_{101}$ may be the $C_1$-$C_{60}$ alkyl group. The $C_1$-$C_{60}$ alkyl group may be a methoxy group, an ethoxy group, or an isopropyloxy group.

The $C_2$-$C_{60}$ alkenyl group described herein may refer to a hydrocarbon group formed by substituting at least one carbon double bond in the middle or at the terminal of the $C_2$-$C_{60}$ alkyl group. The $C_2$-$C_{60}$ alkenyl group may be an ethenyl group, a propenyl group, or a butenyl group. A $C_2$-$C_{60}$ alkenylene group described herein may refer to a divalent group having the same structure as a $C_2$-$C_{60}$ alkenyl group.

The $C_2$-$C_{60}$ alkynyl group described herein may refer to a hydrocarbon group formed by substituting at least one carbon triple bond in the middle or at the terminal of the $C_2$-$C_{60}$ alkyl group. The $C_2$-$C_{60}$ alkynyl group may be an ethynyl group or a propynyl group. A $C_2$-$C_{60}$ alkynylene group described herein may refer to a divalent group having the same structure as a $C_2$-$C_{60}$ alkynyl group.

The $C_3$-$C_{10}$ cycloalkyl group described herein may refer to a monovalent monocyclic saturated hydrocarbon group including 3 to 10 carbon atoms. The $C_3$-$C_{10}$ cycloalkyl group may be a cyclopropyl group, a cyclobutyl group, a cyclopentyl group, a cyclohexyl group, or a cycloheptyl group. The $C_3$-$C_{10}$ cycloalkylene group described herein may refer to a divalent group having the same structure as the $C_3$-$C_{10}$ cycloalkyl group.

A $C_1$-$C_{10}$ heterocycloalkyl group described herein may refer to a monovalent monocyclic group including at least one heteroatom selected from N, O, P, and S as a ring-forming atom and 1 to 10 carbon atoms. The $C_1$-$C_{10}$ heterocycloalkyl group may be a tetrahydrofuranyl group or a tetrahydrothiophenyl group.

The $C_3$-$C_{10}$ cycloalkenyl group described herein may refer to a monovalent monocyclic group that has 3 to 10 carbon atoms and at least one double bond in its ring, and which is not aromatic. The $C_3$-$C_{10}$ cycloalkenyl group may be a cyclopentenyl group, a cyclohexenyl group, or a cycloheptenyl group.

The $C_1$-$C_{10}$ heterocycloalkenyl group described herein may refer to a monovalent monocyclic group including at least one heteroatom selected from N, O, P, and S as a ring-forming atom, 1 to 10 carbon atoms, and at least one double bond in its ring. The $C_1$-$C_{10}$ heterocycloalkenyl group may be a 2,3-hydrofuranyl group or a 2,3-hydrothiophenyl group.

The $C_6$-$C_{60}$ aryl group described herein may refer to a monovalent group having a carbocyclic aromatic system having 6 to 60 carbon atoms. The $C_6$-$C_{60}$ aryl group may be a phenyl group, a naphthyl group, an anthracenyl group, a phenanthrenyl group, a pyrenyl group, or a chrysenyl group. When the $C_6$-$C_{60}$ aryl group includes a plurality of rings, the rings may be fused to each other.

The $C_1$-$C_{60}$ heteroaryl group described herein may refer to a monovalent group having a carbocyclic aromatic system including at least one heteroatom selected from N, O, P, and S as a ring-forming atom and 1 to 60 carbon atoms. The $C_1$-$C_{60}$ heteroaryl group may be a pyridinyl group, a pyrimidinyl group, a pyrazinyl group, a pyridazinyl group, a triazinyl group, a quinolinyl group, or an isoquinolinyl group. When the $C_1$-$C_{60}$ heteroaryl group includes a plurality of rings, the rings may be fused to each other.

The $C_6$-$C_{60}$ aryloxy group described herein may be referred to as —$OA_{102}$. $A_{102}$ may be the $C_6$-$C_{60}$ aryl group. The $C_6$-$C_{60}$ arylthio group described herein may be referred to as —$SA_{103}$. $A_{103}$ may be the $C_6$-$C_{60}$ aryl group).

The monovalent non-aromatic condensed polycyclic group described herein may refer to a monovalent group that has two or more rings condensed to each other, and has only carbon atoms (for example, the number of carbon atoms may be in a range of 8 to 60) as ring forming atoms. The molecular structure as a whole may be non-aromatic. The monovalent non-aromatic condensed polycyclic group may be a fluorenyl group. A divalent non-aromatic condensed polycyclic group described herein may refer to a divalent group having the same structure as the monovalent non-aromatic condensed polycyclic group.

The monovalent non-aromatic condensed heteropolycyclic group described herein may refer to a monovalent group that has two or more rings condensed to each other, and has a heteroatom selected from N, O, P, and S, other than carbon atoms (for example, the number of carbon atoms may be in a range of 2 to 60), as ring-forming atoms. The molecular structure as a whole may be non-aromatic. The monovalent non-aromatic condensed heteropolycyclic group may include a carbazolyl group. A divalent non-aromatic condensed hetero-polycyclic group described herein may refer to a divalent group having the same structure as the monovalent non-aromatic condensed hetero-polycyclic group.

At least one substituent of the substituted $C_1$-$C_{60}$ alkyl group, substituted $C_2$-$C_{60}$ alkenyl group, substituted $C_2$-$C_{60}$ alkynyl group, substituted $C_1$-$C_{60}$ alkoxy group, substituted $C_3$-$C_{10}$ cycloalkyl group, substituted $C_1$-$C_{10}$ heterocycloalkyl group, substituted $C_3$-$C_{10}$ cycloalkenyl group, substituted $C_1$-$C_{10}$ heterocycloalkenyl group, substituted $C_6$-$C_{60}$ aryl group, substituted $C_6$-$C_{60}$ aryloxy group, substituted $C_6$-$C_{60}$ arylthio group, substituted $C_1$-$C_{60}$ heteroaryl group, substituted monovalent non-aromatic condensed polycyclic group, and substituted monovalent non-aromatic condensed heteropolycyclic group may be selected from a deuterium, —F, —Cl, —Br, —I, a hydroxyl group, a cyano group, a nitro group, an amino group, an amidino group, a hydrazine group, a hydrazone group, a carboxylic acid or a salt thereof, a sulfonic acid or a salt thereof, a phosphoric acid or a salt thereof, a $C_1$-$C_{60}$ alkyl group, a $C_2$-$C_{60}$ alkenyl group, a $C_2$-$C_{60}$ alkynyl group, and a $C_1$-$C_{60}$ alkoxy group.

At least one substituent of the substituted $C_1$-$C_{60}$ alkyl group, substituted $C_2$-$C_{60}$ alkenyl group, substituted $C_2$-$C_{60}$ alkynyl group, substituted $C_1$-$C_{60}$ alkoxy group, substituted $C_3$-$C_{10}$ cycloalkyl group, substituted $C_1$-$C_{10}$ heterocycloalkyl group, substituted $C_3$-$C_{10}$ cycloalkenyl group, substituted $C_1$-$C_{10}$ heterocycloalkenyl group, substituted $C_6$-$C_{60}$ aryl group, substituted $C_6$-$C_{60}$ aryloxy group, substituted $C_6$-$C_{60}$ arylthio group, substituted $C_1$-$C_{60}$ heteroaryl group, substituted monovalent non-aromatic condensed polycyclic group, and substituted monovalent non-aromatic condensed heteropolycyclic group may be selected from a $C_3$-$C_{10}$ cycloalkyl group, a $C_1$-$C_{10}$ heterocycloalkyl group, a $C_3$-$C_{10}$ cycloalkenyl group, a $C_1$-$C_{10}$ heterocycloalkenyl group, a $C_6$-$C_{60}$ aryl group, a $C_6$-$C_{60}$ aryloxy group, a $C_6$-$C_{60}$ arylthio group, a $C_1$-$C_{60}$ heteroaryl group, a monovalent non-aromatic condensed polycyclic group, and a monovalent non-aromatic condensed heteropolycyclic group.

$Q_1$, $Q_2$, $Q_3$, $Q_4$, and $Q_5$ may be each independently selected from a hydrogen, a deuterium, —F, —Cl, —Br, —I, a hydroxyl group, a cyano group, a nitro group, an amino group, an amidino group, a hydrazine group, a hydrazone group, a carboxylic acid or a salt thereof, a sulfonic acid or a salt thereof, a phosphoric acid or a salt thereof, a $C_1$-$C_{60}$ alkyl group, a $C_2$-$C_{60}$ alkenyl group, a $C_2$-$C_{60}$ alkynyl group, a $C_1$-$C_{60}$ alkoxy group, a $C_3$-$C_{10}$ cycloalkyl group, a $C_1$-$C_{10}$ heterocycloalkyl group, a $C_3$-$C_{10}$ cycloalkenyl group, a $C_1$-$C_{10}$ heterocycloalkenyl group, a $C_6$-$C_{60}$ aryl group, a $C_1$-$C_{60}$ heteroaryl group, a monovalent non-aromatic condensed polycyclic group, and a monovalent non-aromatic condensed heteropolycyclic group.

"Ph" as recited herein may refer to a phenyl group. "Me" as recited herein may refer to a methyl group. "Et" as recited herein may refer to an ethyl group. "ter-Bu" or "But" as recited herein may refer to a tert-butyl group.

Hereinafter, an organic light-emitting device according to some exemplary embodiments of the present invention will be described in more detail. A statement that B was used instead of A or a similar statement used in describing Synthesis Examples may mean that a molar equivalent of A is identical to a molar equivalent of B.

Figure 3A:
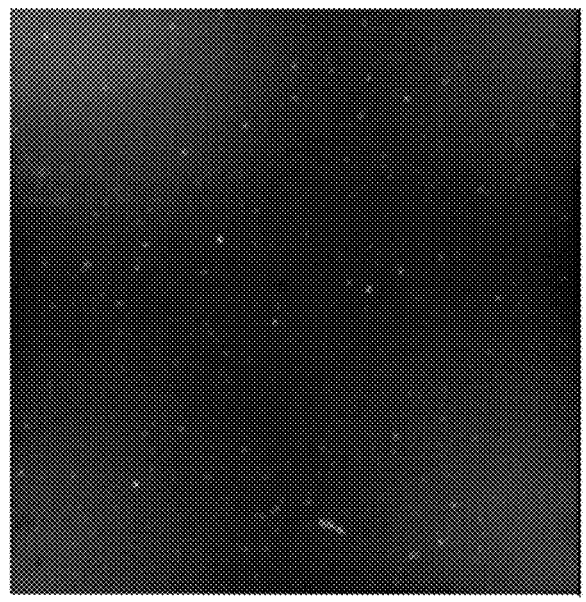
FIGS. 3A, 3B and 3C each illustrate an exemplary image of a display surface of an LCD prepared in Examples 1 to 3, respectively, while irradiating a first substrate of the LCD with a back light.
Figure 3B:
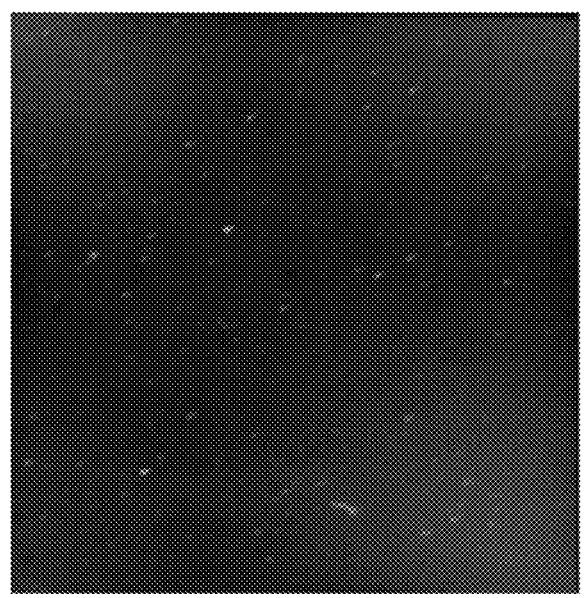
Figure 3C:
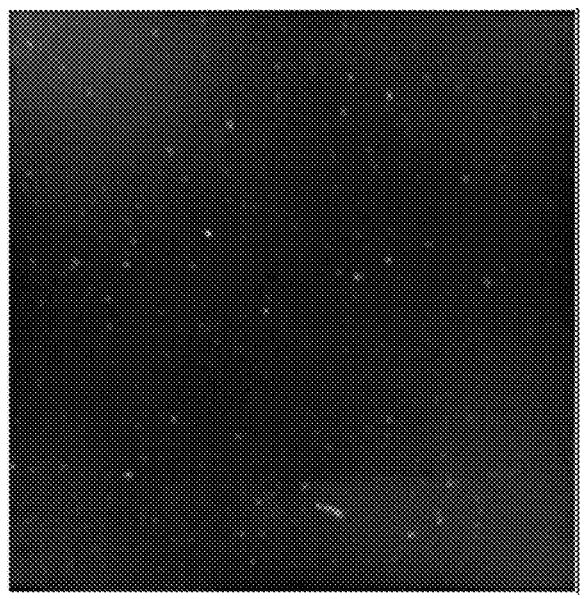
Figure 4A:
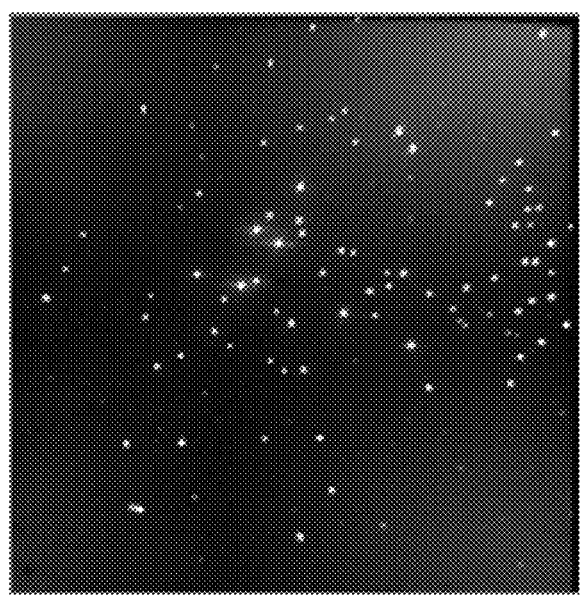
FIGS. 4A, 4B, 4C, 4D, 4E, 4F and 4G each illustrate an exemplary image of a display surface of an LCD prepared in Comparative Examples 1 to 7, respectively, while irradiating a first substrate of the LCD with a back light.
Figure 4B:
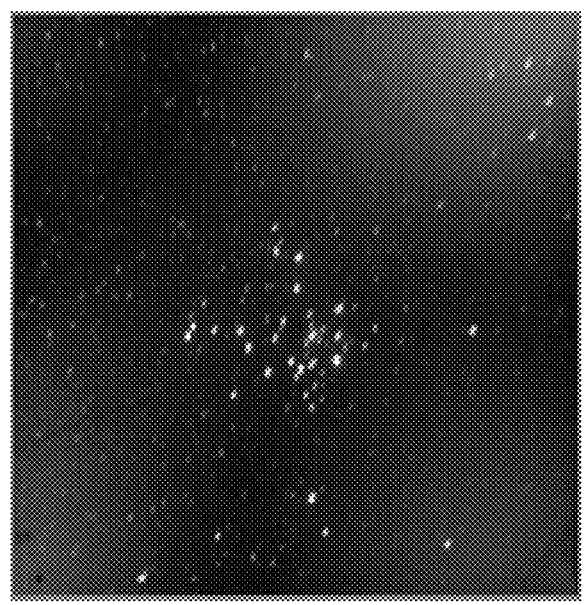
Figure 4C:
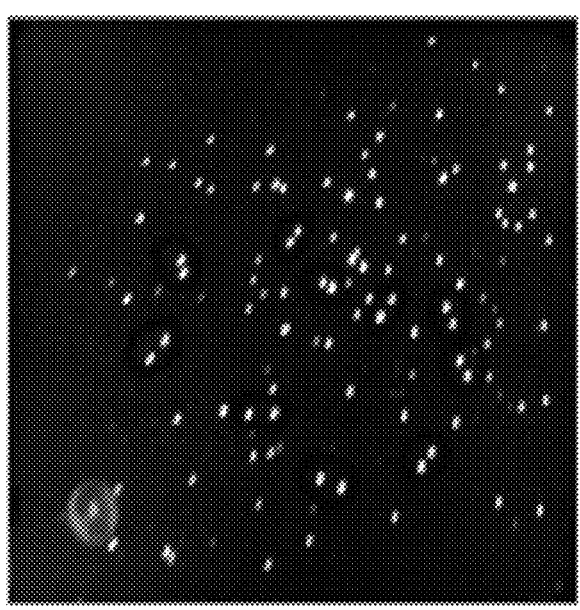
Figure 4D:
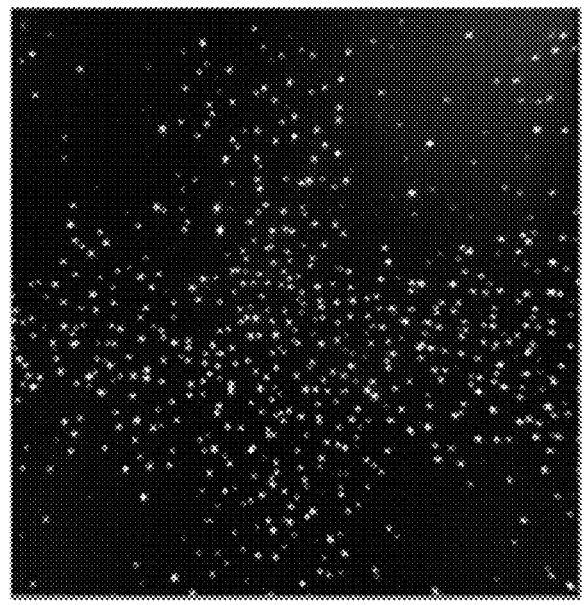
Figure 4E:
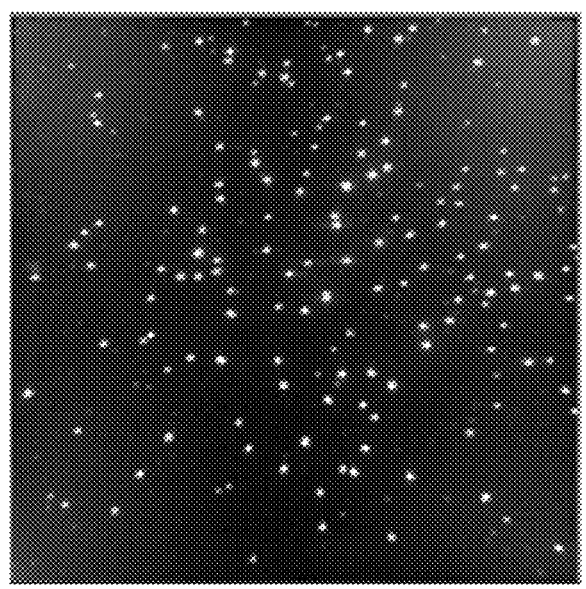
Figure 4F:
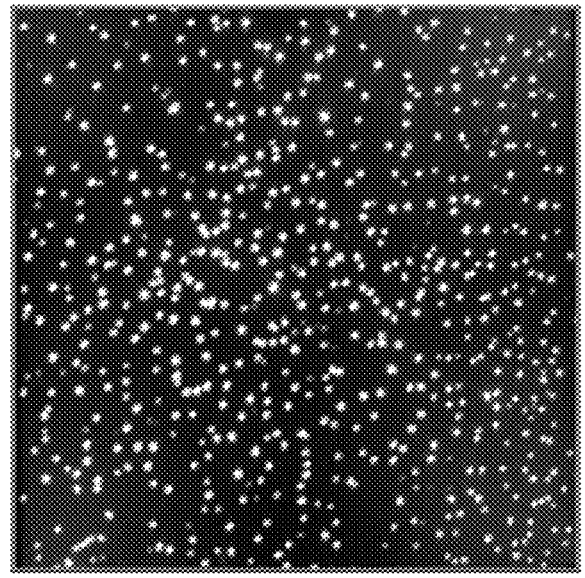
Figure 4G:

FIGS. 3A, 3B and 3C each illustrate an exemplary image of a display surface of an LCD prepared in Examples 1 to 3, respectively, while irradiating a first substrate of the LCD with a back light.

FIGS. 4A, 4B, 4C, 4D, 4E, 4F and 4G each illustrate an exemplary image of a display surface of an LCD prepared in Comparative Examples 1 to 7, respectively, while irradiating a first substrate of the LCD with a back light.

Preparation Example 1: Preparation of Alignment Layer-Forming Composition 1

0.36 parts by weight of Compound 1-1, 0.12 parts by weight of Compound 1-3, and 3.52 parts by weight of the vertical alignment polymer may be mixed in 96 parts by weight of a solvent that is a mixture of N-vinylpyrrolidone and butyl cellulose at a volume ratio of 1:1, thereby preparing an alignment layer-forming composition 1.

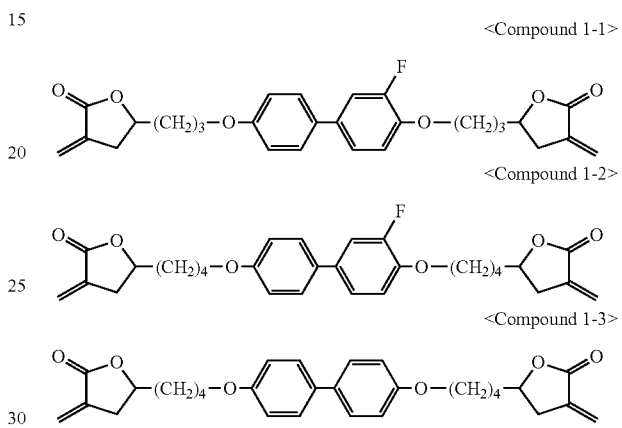

<Compound 1-1>

<Compound 1-2>

<Compound 1-3>

Comparative Preparation Example 1: Preparation of Alignment Layer-Forming Composition A An alignment layer-forming composition A may be prepared in substantially the same manner as in Preparation Example 1, except that 0.48 parts by weight of Compound 1-1 may be used instead of Compounds 1-1 and 1-3.

Comparative Preparation Example 2: Preparation of Alignment Layer-Forming Composition B An alignment layer-forming composition B may be prepared in substantially the same manner as in Preparation Example 1, except that 0.48 parts by weight of Compound 1-2 may be used instead of Compounds 1-1 and 1-3.

Comparative Preparation Example 3: Preparation of Alignment Layer-Forming Composition C An alignment layer-forming composition C may be prepared in substantially the same manner as in Preparation Example 1, except that 0.48 parts by weight of Compound 1-3 may be used instead of Compounds 1-1 and 1-3.

Example 1: Manufacture of LCD 1

The alignment layer-forming composition 1 prepared in Preparation Example 1 may be spin-coated on an ITO surface of a first substrate on which an ITO electrode pattern is formed. A first heating may be performed thereon in a hot plate at about 95° C. for about 120 seconds. A second heating may be performed thereon in a hot air circulation oven at about 210° C. for about 1000 seconds, thereby forming an alignment layer. Then, a bead spacer may be sprayed on the alignment layer of the first substrate, and a sealant may be printed thereon. Liquid crystals may be deposited on the sealing pattern under a vacuum condition. A second substrate may be bonded to the first substrate. The printed pattern including the sealant may be allowed to harden at about 100° C. for about 70 minutes. Annealing (e.g., by Isotropic treatment) may be performed on the bonded first substrate and second substrate in a chamber at about 110° C. for about 120 minutes. The bonded first substrate and second substrate may be irradiated with UV light of about 6.55 J/cm$^2$ for about 5 minutes and irradiated with fluorescent UV light of about 0.15 mW/cm$^2$ for about 40 minutes, while a voltage of about 15 V is applied to the bonded first substrate and second substrate, thereby manufacturing LCD Example 2: Manufacture of LCD 2

LCD 2 may be manufactured in substantially the same manner as in Example 1, except that the second heating may be performed at about 220° C.

Example 3: Manufacture of LCD 3

LCD 3 may be manufactured in substantially the same manner as in Example 1, except that the second heating may be performed at about 230° C.

Comparative Example 1: Manufacture of LCD A

LCD A may be manufactured in substantially the same manner as in Example 1, except that the alignment layer-forming composition A prepared in Comparative Preparation Example 1 may be used instead of the alignment layer-forming composition 1 prepared in Preparation Example 1.

Comparative Example 2: Manufacture of LCD B

LCD B may be manufactured in substantially the same manner as in Example 1, except that the alignment layer-forming composition B prepared in Comparative Preparation Example 2 may be used instead of the alignment layer-forming composition 1 prepared in Preparation Example 1.

Comparative Example 3: Manufacture of LCD C

LCD C may be manufactured in substantially the same manner as in Example 1, except that the alignment layer-forming composition C prepared in Comparative Preparation Example 3 may be used instead of the alignment layer-forming composition 1 prepared in Preparation Example 1.

Comparative Example 4: Manufacture of LCD D

LCD D may be manufactured in substantially the same manner as in Example 1, except that the alignment layer-forming composition A prepared in Comparative Preparation Example 1 may be used instead of the alignment layer-forming composition 1 prepared in Preparation Example 1, and the second heating may be performed at about 220° C.

Comparative Example 5: Manufacture of LCD E

LCD E may be manufactured in substantially the same manner as in Example 1, except that the alignment layer-forming composition B prepared in Comparative Preparation Example 2 may be used instead of the alignment layer-forming composition 1 prepared in Preparation Example 1, and the second heating may be performed at about 220° C.

Comparative Example 6: Manufacture of LCD F

LCD F may be manufactured in substantially the same manner as in Example 1, except that the alignment layer-forming composition C prepared in Comparative Preparation Example 3 may be used instead of the alignment layer-forming composition 1 prepared in Preparation Example 1, and the second heating may be performed at about 220° C.

Comparative Example 7: Manufacture of LCD G

LCD G may be manufactured in substantially the same manner as in Example 1, except that the alignment layer-forming composition C prepared in Comparative Preparation Example 3 may be used instead of the alignment layer-forming composition 1 prepared in Preparation Example 1, and the second heating may be performed at about 200° C.

Evaluation Example

Light leakage and after-image of LCDs manufactured in Examples 1 to 3 and Comparative Examples 1 to 7 may be evaluated by using the method described below, as illustrated in Table 1 below.

(Exemplary Light Leakage Evaluation)

LCDs manufactured in Examples 1 to 3 and Comparative Examples 1 to 7 may be left in a darkroom, and the first substrate sides of the LCDs may be irradiated with back light. Light leakages (e.g., white dots are seen) from display surfaces (e.g., from the second substrate) of the LCDs may be photographed by a digital camera (e.g., Samsung Electronics, NX1000) and may be observed with the naked eye. A degree of light leakage may be evaluated based on the below criteria.

Moderate light leakage: Light leakage is hardly seen with the naked eye (e.g., no white dots are visible to the naked eye).

Normal light leakage: Slight light leakage is visible to the naked eye (e.g., a relatively few white dots are visible to the naked eye).

Poor light leakage: A relatively large amount of light leakage is visible to the naked eye. (e.g., several white dots are visible to the naked eye).

(Exemplary after-Image Evaluation)

A plurality of pixels may be disposed on each LCD manufactured in Examples 1 to 3 and Comparative Examples 1 to 7. Among the plurality of pixels, some pixels alternately disposed horizontally and vertically may exhibit a black color, and the other pixels may exhibit a white color and may display a grid pattern of black and white. About 60 minutes after observing the grid pattern, the grid pattern of black and white may no longer be visible, and the LCD may only exhibit a black color. It may be observed with the naked eye that a linear after-image or surface after-image was found 24 hours after and 168 hours after observing the grid pattern. A degree of after-image may be evaluated based on the below criteria.

Moderate after image: After-image is hardly seen with the naked eye (e.g., no linear after-image or surface after-image is visible to the naked eye).

Normal after image: Slight after-image is seen with the naked eye (e.g., a relatively few linear after-images or surface after-images are seen with the naked eye).

Poor after image: A relatively large number of after-images are visible to the naked eye (e.g., several linear after-images or surface after-images are visible to the naked eye).

TABLE 1

| | Alignment layer-forming composition | Second heating temperature (° C.) | Light leakage | After-image |
|---|---|---|---|---|
| Example 1 | 1 | 210° C. | Moderate | Moderate |
| Example 2 | 1 | 220° C. | Moderate | Moderate |
| Example 3 | 1 | 230° C. | Moderate | Moderate |
| Comparative Example 1 | A | 210° C. | Poor | Moderate |
| Comparative Example 2 | B | 210° C. | Poor | Moderate |
| Comparative Example 3 | C | 210° C. | Poor | Poor |
| Comparative Example 4 | A | 220° C. | Poor | Poor |
| Comparative Example 5 | B | 220° C. | Poor | Poor |
| Comparative Example 6 | C | 220° C. | Poor | Poor |
| Comparative Example 7 | C | 200° C. | Normal | Poor |

Referring to Table 1, the LCDs manufactured in Examples 1 to 3 may have no light leakage and reduced after-image, compared to the LCDs manufactured in Comparative Examples 1 to 7. Thus, the LCDs manufactured in Examples 1 to 3 may have increased display quality. Display quality may be increased under various temperature conditions, for example, at about 220° C. to about 230° C., which may result in a higher process margin.

As described above, according to exemplary embodiments of the present invention, the LCD including the alignment layer may have increased display quality, reduced light leakage and a reduced occurrence of after-images.

It should be understood that the exemplary embodiments of the present invention should be considered in a descriptive sense and not for purposes of limitation. Descriptions of features or aspects of exemplary embodiment of the present invention should typically be considered as available for other similar features or aspects in other exemplary embodiments of the present invention.

While the present invention has been shown and described with reference to the exemplary embodiments thereof, it will be apparent to those of ordinary skill in the art that various changes in form and detail may be made thereto without departing from the spirit and scope of the present invention.

What is claimed is:
1. An alignment layer, comprising:
a cross-linked copolymer formed of a first compound and a second compound,
wherein the first compound is different than the second compound,
wherein the first compound and the second compound are each independently selected from a compound represented by Formula 1:

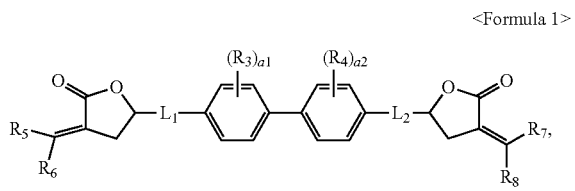

<Formula 1> wherein in Formula 1,
$L_1$ is selected from a single bond or —$R_1$O—, and $L_2$ is selected from a single bond or —O$R_2$—,
wherein $R_1$ and $R_2$ are each independently a substituted or unsubstituted $C_1$-$C_{20}$ alkylene group,
wherein $R_3$ and $R_4$ are each independently selected from —F, a cyano group, a nitro group, a methyl group, an ethyl group, a propyl group, an n-butyl group, an iso-butyl group, a sec-butyl group, a tert-butyl group, an n-pentyl group, an iso-pentyl group, a sec-pentyl group, a tert-pentyl group, an n-hexyl group, an iso-hexyl group, a sec-hexyl group, a tert-hexyl group, an n-heptyl group, an iso-heptyl group, a sec-heptyl group, a tert-heptyl group, an n-octyl group, an iso-octyl group, a sec-octyl group, a tert-octyl group, an n-nonyl group, an iso-nonyl group, a sec-nonyl group, a tert-nonyl group, an n-decanyl group, an iso-decanyl group, a sec-decanyl group, a tert-decanyl group, a methoxy group, an ethoxy group, a propoxy group, a butoxy group, a pentoxy group, a phenyl group, a naphthyl group, a pyridinyl group, a pyrimidinyl group, or a triazinyl group; or
a methyl group, an ethyl group, a propyl group, an n-butyl group, an iso-butyl group, a sec-butyl group, a tert-butyl group, an n-pentyl group, an iso-pentyl group, a sec-pentyl group, a tert-pentyl group, an n-hexyl group, an iso-hexyl group, a sec-hexyl group, a tert-hexyl group, an n-heptyl group, an iso-heptyl group, a sec-heptyl group, a tert-heptyl group, an n-octyl group, an iso-octyl group, a sec-octyl group, a tert-octyl group, an n-nonyl group, an iso-nonyl group, a sec-nonyl group, a tert-nonyl group, an n-decanyl group, an iso-decanyl group, a sec-decanyl group, a tert-decanyl group, a methoxy group, an ethoxy group, a propoxy group, a butoxy group, a pentoxy group, a phenyl group, a naphthyl group, a pyridinyl group, a pyrimidinyl group, and a triazinyl group, each substituted with at least one selected from —F, a cyano group, a nitro group, a phenyl group, a naphthyl group, a pyridinyl group, a pyrimidinyl group, a triazinyl group, and —Si($Q_{33}$)($Q_{34}$)($Q_{35}$); or —Si($Q_1$)($Q_2$)($Q_3$);
wherein $Q_1$, $Q_2$, $Q_3$, $Q_{33}$, $Q_{34}$ and $Q_{35}$ are each independently selected from a hydrogen, a $C_1$-$C_{20}$ alkyl group, a $C_1$-$C_2$ alkoxy group, a phenyl group, a naphthyl group, a pyridinyl group, a pyrimidinyl group, a triazinyl group, a quinolinyl group, or an iso-quinolinyl group,
wherein $R_5$, $R_6$, $R_7$ and $R_8$ are each independently selected from a hydrogen, a deuterium, —F, —Cl, —Br, —I, a hydroxyl group, a cyano group, a nitro group, an amino group, an amidino group, a hydrazine group, a hydrazone group, a carboxylic acid or a salt thereof, a sulfonic acid or a salt thereof, a phosphoric acid or a salt thereof, a substituted or unsubstituted $C_1$-$C_{20}$ alkyl group, or a substituted or unsubstituted $C_1$-$C_{20}$ alkoxy group, wherein a1 and a2 are each independently an integer selected from 0 to 4, wherein at least one substituent of the substituted $C_1$-$C_{20}$ alkylene group, substituted $C_1$-$C_{60}$ alkyl group, substituted $C_2$-$C_{60}$ alkenyl group, substituted $C_2$-$C_{60}$ alkynyl group, substituted $C_1$-$C_{60}$ alkoxy group, substituted $C_3$-$C_{10}$ cycloalkyl group, substituted $C_1$-$C_{10}$ heterocycloalkyl group, substituted $C_3$-$C_{10}$ cycloalkenyl group, substituted $C_1$-$C_{10}$ heterocycloalkenyl group, substituted $C_6$-$C_{60}$ aryl group, substituted $C_6$-$C_{60}$ aryloxy group, substituted $C_6$-$C_{60}$ arylthio group, substituted $C_1$-$C_{60}$ heteroaryl group, substituted monovalent non-aromatic condensed polycyclic group, and substituted monovalent non-aromatic condensed heteropolycyclic group is selected from a deuterium, —F, —Cl, —Br, —I, a hydroxyl group, a cyano group, a nitro group, an amino group, an amidino group, a hydrazine group, a hydrazone group, a carboxylic acid or a salt thereof, a sulfonic acid or a salt thereof, a phosphoric acid or a salt thereof, a $C_1$-$C_{60}$ alkyl group, a $C_2$-$C_{60}$ alkenyl group, a $C_2$-$C_{60}$ alkynyl group, a $C_1$-$C_{60}$ alkoxy group, a $C_3$-$C_{10}$ cycloalkyl group, a $C_1$-$C_{10}$ heterocycloalkyl group, a $C_3$-$C_{10}$ cycloalkenyl group, a $C_1$-$C_{10}$ heterocycloalkenyl group, a $C_6$-$C_{60}$ aryl group, a $C_6$-$C_{60}$ aryloxy group, a $C_6$-$C_{60}$ arylthio group, a $C_1$-$C_{60}$ heteroaryl group, a monovalent non-aromatic condensed polycyclic group, or a monovalent non-aromatic condensed heteropolycyclic group, wherein $Q_1$, $Q_2$, $Q_3$, $Q_4$, and $Q_5$ are each independently selected from a hydrogen, a deuterium, —F, —Cl, —Br, —I, a hydroxyl group, a cyano group, a nitro group, an amino group, an amidino group, a hydrazine group, a hydrazone group, a carboxylic acid or a salt thereof, a sulfonic acid or a salt thereof, a phosphoric acid or a salt thereof, a $C_1$-$C_{60}$ alkyl group, a $C_2$-$C_{60}$ alkenyl group, a $C_2$-$C_{60}$ alkynyl group, a $C_1$-$C_{60}$ alkoxy group, a $C_3$-$C_{10}$ cycloalkyl group, a $C_1$-$C_{10}$ heterocycloalkyl group, a $C_3$-$C_{10}$ cycloalkenyl group, a $C_1$-$C_{10}$ heterocycloalkenyl group, a $C_6$-$C_{60}$ aryl group, a $C_1$-$C_{60}$ heteroaryl group, a monovalent non-aromatic condensed polycyclic group, or a monovalent non-aromatic condensed heteropolycyclic group;

wherein the first compound is selected from a compound in which at least one of a1 and a2 in Formula 1 is 1, 2, 3, or 4, and the second compound is selected from a compound in which at least one of a1 and a2 in Formula 1 is 0; and wherein an amount of the first compound is about 70 parts by weight to about 80 parts by weight based on 100 parts by weight of a total amount of the first compound and the second compound, and the amount of the second compound is about 20 parts by weight to about 30 parts by weight based on 100 parts by weight of the total amount of the first compound and the second compound.

2. The alignment layer of claim 1, wherein $L_1$ is —$R_1O$—, and $L_2$ is —$OR_2$—, and wherein $R_1$ and $R_2$ are each independently a $C_1$-$C_{20}$ alkylene group.

3. The alignment layer of claim 1, wherein a1 and a2 are each independently selected from 0 and 1.

4. The alignment layer of claim 1, wherein the first compound is selected from a compound in which $R_1$ and $R_2$ in Formula 1 are a $C_1$-$C_3$ alkylene group, and the second compound is selected from a compound in which $R_1$ and $R_2$ in Formula 1 are a $C_4$-$C_{20}$ alkylene group.

5. The alignment layer of claim 1, wherein the compound represented by Formula 1 is represented by one of Compounds 1-1, 1-2 and 1-3:

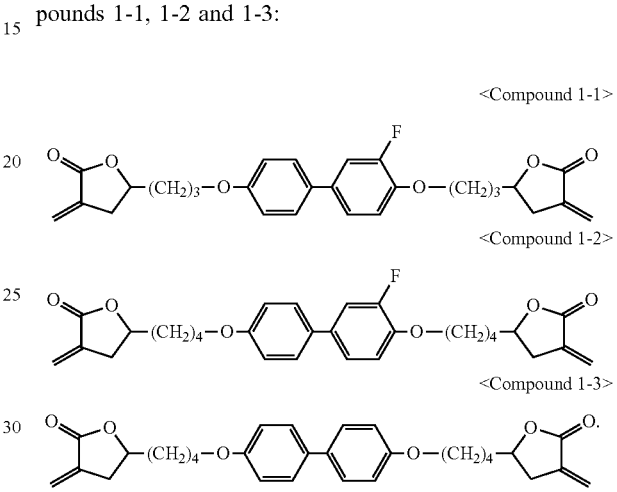

6. The alignment layer of claim 1, wherein the cross-linked copolymer formed of the first compound and the second compound comprises a first repeating unit and a second repeating unit, wherein the first repeating unit is different than the second repeating unit, wherein the first repeating unit and the second repeating unit each independently comprise a polymer selected from a unit represented by Formula 1-1:

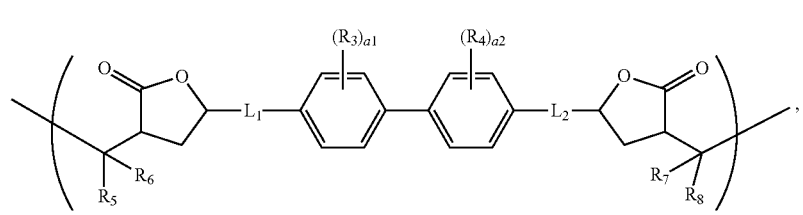

wherein in Formula 1-1, $L_1$ is selected from a single bond or —$R_1O$—, and $L_2$ is selected from a single bond or —$OR_2$—, wherein $R_1$ and $R_2$ are each independently a substituted or unsubstituted $C_1$-$C_{20}$ alkylene group, wherein $R_3$ and $R_4$ are each independently selected from —F, a cyano group, a nitro group, a methyl group, an ethyl group, a propyl group, an n-butyl group, an iso-butyl group, a sec-butyl group, a tert-butyl group, an n-pentyl group, an iso-pentyl group, a sec-pentyl group, a tert-pentyl group, an n-hexyl group, an iso-hexyl group, a sec-hexyl group, a tert-hexyl group, an n-heptyl group, an iso-heptyl group, a sec-heptyl group, a tert-heptyl group, an n-octyl group, an iso-octyl group, a sec-octyl group, a tert-octyl group, an n-nonyl group, an iso-nonyl group, a sec-nonyl group, a tert-nonyl group, an n-decanyl group, an iso-decanyl group, a sec-decanyl group, a tert-decanyl group, a methoxy group, an ethoxy group, a propoxy group, a butoxy group, a pentoxy group, a phenyl group, a naphthyl group, a pyridinyl group, a pyrimidinyl group, Q a triazinyl group;

a methyl group, an ethyl group, a propyl group, an n-butyl group, an iso-butyl group, a sec-butyl group, a tert-butyl group, an n-pentyl group, an iso-pentyl group, a sec-pentyl group, a tert-pentyl group, an n-hexyl group, an iso-hexyl group, a sec-hexyl group, a tert-hexyl group, an n-heptyl group, an iso-heptyl group, a sec-heptyl group, a tert-heptyl group, an n-octyl group, an iso-octyl group, a sec-octyl group, a tert-octyl group, an n-nonyl group, an iso-nonyl group, a sec-nonyl group, a tert-nonyl group, an n-decanyl group, an iso-decanyl group, a sec-decanyl group, a tert-decanyl group, a methoxy group, an ethoxy group, a propoxy group, a butoxy group, a pentoxy group, a phenyl group, a naphthyl group, a pyridinyl group, a pyrimidinyl group, and a triazinyl group, each substituted with at least one selected from —F, a cyano group, a nitro group, a phenyl group, a naphthyl group, a pyridinyl group, a pyrimidinyl group, a triazinyl group, or —Si($Q_{33}$)($Q_{34}$)($Q_{35}$); or —Si($Q_1$)($Q_2$)($Q_3$);

wherein $Q_1$, $Q_2$, $Q_3$, $Q_{31}$, $Q_{32}$ and $Q_{33}$ are each independently selected from a hydrogen, a $C_1$-$C_{20}$ alkyl group, a $C_1$-$C_{20}$ alkoxy group, a phenyl group, a naphthyl group, a pyridinyl group, a pyrimidinyl group, a triazinyl group, a quinolinyl group, or an iso-quinolinyl group, wherein $R_5$, $R_6$, $R_7$ and $R_8$ are each independently selected from a hydrogen, a deuterium, —F, —Cl, —Br, —I, a hydroxyl group, a cyano group, a nitro group, an amino group, an amidino group, a hydrazine group, a hydrazone group, a carboxylic acid or a salt thereof, a sulfonic acid or a salt thereof, a phosphoric acid or a salt thereof, a substituted or unsubstituted $C_1$-$C_{20}$ alkyl group, or a substituted or unsubstituted $C_1$-$C_{20}$ alkoxy group, wherein a1 and a2 are each independently selected from 0 or 1; and wherein the first compound is selected from a compound in which at least one of a1 and a2 in Formula 1 is 1, 2, 3, or 4, and the second compound is selected from a compound in which at least one of a1 and a2 in Formula 1 is 0.

7. The alignment layer of claim 1, further comprising a vertical alignment polymer selected from a polysiloxane, a polyamic acid, polyimide, nylon, polyvinyl alcohol, and polyvinyl chloride, wherein the vertical alignment polymer comprises at least one vertical alignment group.

8. A liquid crystal display (LCD), comprising:
a first substrate;
a second substrate facing the first substrate;
a liquid crystal layer disposed between the first substrate and the second substrate; and
a first alignment layer disposed between the first substrate and the liquid crystal layer,
wherein the first alignment layer is the alignment layer of claim 1.

9. The LCD of claim 8, wherein the liquid crystal layer comprises liquid crystal molecules having a negative (−) dielectric anisotropy.

10. The LCD of claim 8, wherein the cross-linked copolymer including the first compound and the second compound is disposed at an interface between the first alignment layer and the liquid crystal layer.

11. The LCD of claim 8, further comprising a second alignment layer disposed between the second substrate and the liquid crystal layer.

12. The LCD of claim 8, wherein the second alignment layer comprises at least one selected from a polysiloxane, a polyamic acid, polyimide, nylon, polyvinyl alcohol, and polyvinyl chloride.

* * * * *